United States Patent
Ragavan et al.

(10) Patent No.: US 11,290,542 B2
(45) Date of Patent: *Mar. 29, 2022

(54) SELECTING A DEVICE FOR COMMUNICATIONS SESSION

(71) Applicant: Amazon Technologies, Inc., Seattle, WA (US)

(72) Inventors: Nivash Srinivasa Ragavan, Redmond, WA (US); Siddhesh Shirsat, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,280

(22) Filed: Aug. 21, 2020

(65) Prior Publication Data

US 2020/0382608 A1 Dec. 3, 2020

Related U.S. Application Data

(63) Continuation of application No. 15/716,347, filed on Sep. 26, 2017, now Pat. No. 10,791,178.

(51) Int. Cl.
| | |
|---|---|
| G06F 15/16 | (2006.01) |
| H04L 67/141 | (2022.01) |
| G06F 3/16 | (2006.01) |
| G10L 15/22 | (2006.01) |
| H04L 67/63 | (2022.01) |
| G10L 15/18 | (2013.01) |
| G06F 40/295 | (2020.01) |
| G10L 15/08 | (2006.01) |

(52) U.S. Cl.
CPC ............ *H04L 67/141* (2013.01); *G06F 3/167* (2013.01); *G06F 40/295* (2020.01); *G10L 15/1815* (2013.01); *G10L 15/22* (2013.01); *H04L 67/327* (2013.01); *G10L 2015/088* (2013.01); *G10L 2015/223* (2013.01)

(58) Field of Classification Search
CPC ... H04L 67/141; H04L 67/327; G06F 40/295; G06F 3/167; G10L 15/1815; G10L 15/22; G10L 2015/088; G10L 2015/223
See application file for complete search history.

(56) References Cited

U.S. PATENT DOCUMENTS

| | | | |
|---|---|---|---|
| 2005/0207424 A1* | 9/2005 | Hallin | H04L 69/329 370/395.52 |
| 2006/0235994 A1* | 10/2006 | Wu | H04L 67/14 709/238 |
| 2017/0251150 A1* | 8/2017 | Roylance | G09B 21/009 |
| 2017/0270919 A1* | 9/2017 | Parthasarathi | G10L 15/02 |

* cited by examiner

*Primary Examiner* — Razu A Miah
*Assistant Examiner* — Joseph R Maniwang
(74) *Attorney, Agent, or Firm* — Pierce Atwood LLP

(57) ABSTRACT

Methods and systems for establishing communications between an initiating device and another device selected from multiple potential devices are described herein. In some embodiments, a communications between the initiating device and a recipient device may be initiated after a device is selected as the recipient device. The second device may be one of a series of devices associated with a user account that is selected based on any one of a combination of various factors, such as presence information, wakeword count, user preferences, etc.

19 Claims, 5 Drawing Sheets

US 11,290,542 B2

SELECTING A DEVICE FOR COMMUNICATIONS SESSION

CROSS-REFERENCE TO RELATED APPLICATIONS

This patent application is a continuation of, and claims priority to, U.S. patent application Ser. No. 15/716,347, titled "SELECTING A DEVICE FOR COMMUNICATIONS SESSION", filed Sep. 26, 2017, the contents of which are hereby incorporated by reference in its entirety.

BACKGROUND

Electronic devices are being used more and more by users to communicate with each passing day. Some electronic devices may attempt to initiate a communications session with a plurality of electronic devices. Some electronic devices may be able to select a recipient device of the plurality of devices.

DETAILED DESCRIPTION

Figure 1:
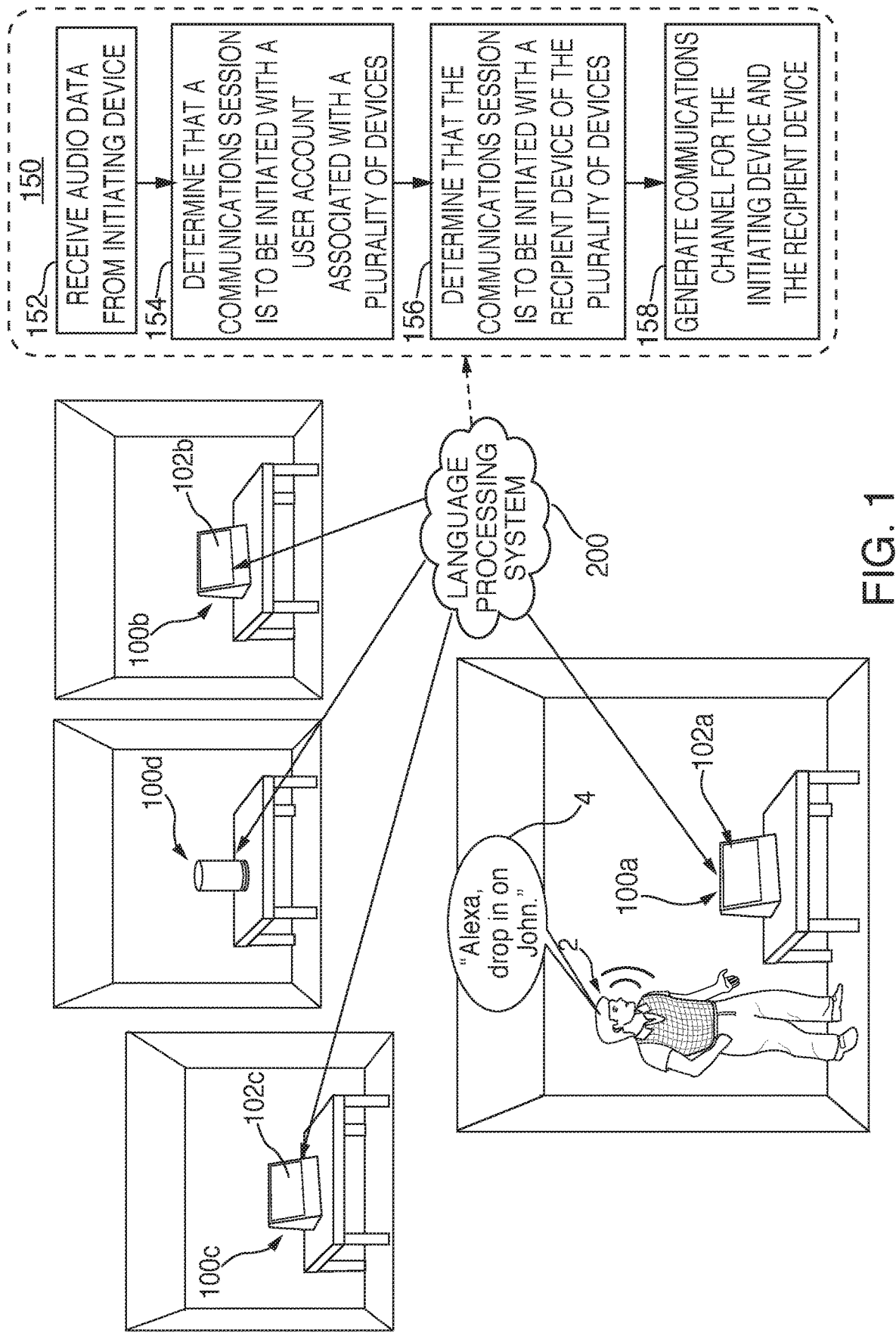
FIG. 1 is an illustrative diagram of an exemplary system for determining a recipient device for a communications session with an initiating device, in accordance with various embodiments.

The present disclosure, as set forth below, is generally directed to various embodiments of methods and systems for selecting a recipient device to communicate with an initiating device.

Many households, offices, residences, and/or any other space, may include one or more electronic devices that are associated with one user account. For example, a household may include one or more voice activated electronic devices. As described herein, a "shared device," a "communal device," and/or a "multi-user device," may correspond to various types of electronic devices that are capable of being used by multiple individuals, and, in particular, may be configured to be interacted with by multiple individuals. Voice activated electronic devices, sound activated electronic devices, and/or manually activated electronic devices may all correspond to exemplary types of shared devices. An individual located proximate to such a shared device, for example, may be capable of interacting with the shared device either via voice, sound, and/or physical input, depending on the particular device's capabilities and configuration. For example, voice activated electronic devices may be used by one or more individuals to facilitate a plethora of actions, such as, and without limitation, outputting content, obtaining information, interacting with additional devices/systems, and/or communicating with other individuals. As an illustrative example, an individual may use their voice activated electronic device to play music, order food, obtain weather information, and/or communicate with a friend or family member.

In a non-limiting example embodiment, a first individual may speak an utterance to a voice activated electronic device requesting to initiate a communications session with a second individual. As an illustrative example, the first individual my say "Alexa, drop in on Mike." In response to determining that the wakeword (e.g., "Alexa") was uttered, the voice activated electronic device may package and send audio data representing the utterance to a language processing system. Upon receipt, the language processing system, which may include a speech-processing system, may generate text data representing the audio data by performing speech-to-text processing. Using the text data, natural language understanding processing may be used to determine that an intent of the utterance is to generate a communications channel between the voice activated electronic device and a device associated with a "contact" associated with the first individual's user account (i.e., "Mike").

In other, non-limiting embodiments, a first individual may access a contact on a contact list on a screen of an electronic device, such as a smart phone, tablet computer, etc. While common contact information may include phone numbers, physical addresses, e-mail addresses, and the like, contacts may also include, as described in more detail below and in accordance with the principles described in the present disclosure, an identification of devices that the contact may be reached at. For example, "Mike" may have three phone numbers, two addresses, and two e-mail addresses listed on his contact. Mike also, however, may have electronic devices listed, such as "Echo Show—kitchen," "Echo—work," "Echo—living room," and "Echo Show—Bedroom." As set forth above, the first individual, who is trying to contact "Mike," can simply select "Drop In," assuming "Mike" has enrolled in the Drop In Feature, and, as set forth in the accompanying figures and described throughout the present disclosure, the methods and systems will determine which one of Mike's devices is the most likely place to find Mike, and then attempt to open a communications channel to Mike based on that determination. That determination can be made using presence information, which can take many forms. For example, if "Mike" was listening to music on "Echo—work" then the system would determine with a very high degree of certainty, that "Mike" was at work, select the "Echo—work" device, and attempt to open a communications channel with that Echo, instead of any of the other similar devices that are associated with "Mike" on a contact for "Mike." Presence information, as described below and throughout this disclosure, can be based on a number of factors, such as whether an electronic device detects sounds indicative of someone being nearby (for example, if three of "Mike's" devices detect no sound and a fourth detects human speech, the system would determine that "Mike" was most likely present at the fourth device and open the communications channel there).

Contact, in this instance, refers to data stored in a database associated primarily with the name of an entity, where the entity could be an individual, a group of individuals (for example, "Work Friends"), a business, a family, etc. The data associated with each name in a "contact" can include one or more various ways in which communications with the entity associated with the name may be accomplished, such as a physical address, one or more e-mail addresses, one or more phone numbers (e.g., a work number, a home number, and a mobile number), one or more electronic device addresses (e.g., specific MAC addresses through which direct device-to-device communications may be established across a network, such as the MAC address of an Amazon Echo). In addition, contact data might include application IDs for any one of a number of ways to communicate through social media, such as through Twitter, Facebook, Instagram, Snapchat, etc.

In some embodiments, a device identifier (such as a MAC address) and/or customer identifier associated with the voice activated electronic device may also be received by the language processing system. For example, in response to determining that the intent is associated with establishing communications to a contact named "Mike," which would require a communications channel between an initiating device and a recipient device associated with "Mike," a communications system and a presence tracking system may receive device identifier information associated with the contact "Mike" that enables the language processing system to determine that multiple electronic devices are associated with "Mike."

In some embodiments, the language processing system may receive information related to each of the electronic devices associated with the intended recipient (in this case, "Mike"). For example, the language processing system may receive presence information, wakeword count information, enablement information, and/or user preference information (or various combinations of that information and/or additional information). Presence information, in some embodiments, may include whether a particular electronic device is in use, or was recently in use. Using this information, in some embodiments, the language processing system may determine which electronic device associated with the intended recipient should be selected for the intended communications. In some embodiments, the electronic devices associated with the intended recipient may be sending presence information updates to the language processing system at regular intervals. This presence information, in some embodiments, can be used to assist the language processing system in determining which device to select as the recipient device.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however it will be recognized that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

In some embodiments, a first individual may speak an utterance to a voice activated electronic device requesting to initiate a communications session with a group of people. As an illustrative example, the first individual my say "Alexa, drop in on the Smiths." In response to determining that the wakeword (e.g., "Alexa") was uttered, the voice activated electronic device may package and send audio data representing the utterance to a language processing system. Upon receipt, the language processing system, which may include a speech-processing system, may generate text data representing the audio data by performing speech-to-text processing. Using the text data, natural language understanding processing may be used to determine that an intent of the utterance is to establish a communications channel between the voice activated electronic device and a device associated with the "Smiths." The language processing system, once the intent is determined, could attempt to find a contact associated with the first individual's user account that would provide contact information associated with the "Smiths," such as, for example, a device identifier for direct device-to-device communications.

As stated above, in some embodiments, a device identifier and/or customer identifier associated with the voice activated electronic device may also be received by the computing system. In particular, in response to determining that the intent is associated with a request to establish a communications channel, a communications system and a presence tracking system may receive a customer identifier from the first individual's contact that is associated with the entry for the "Smiths." From the customer identifier, the system may be able to identify a number of electronic devices that are associated with the "Smiths." In some embodiments, a group account may be associated with the customer identifier. The group account, for example, may include one or more user accounts associated with one or more users that are capable of accessing communications sent and received by individuals in the group account. As an illustrative example, a family may have a voice activated electronic device, where each member of the family (e.g., parents, children, etc.) may be capable of using the voice activated electronic device. The voice activated electronic device may be registered to one particular user account, such as one of the parents, however each member of a group account may have certain permissions/features/skills, etc., that can be maintained per member within the registered account. The group account may be an account that is unique to the particular device with which it is associated with, such that messages sent by the voice activated electronic device may be sent from the group account, for example, a message could be sent from the "Smiths." However, in some embodiments, messages may be sent by the voice activated electronic device from a particular user account within the group account, such as a message sent from "Mike Smith."

As described herein, a group account may be said to be "present" or "active" in response to a corresponding electronic device associated with that group account determines that a presence confidence score is greater than (or equal to) a predefined presence confidence threshold. For example, if an individual speaks an utterance to their electronic device, or more generally interacts with their electronic device, then the device may register that interaction as an activity event. This may indicate that the individual is, at the time of the interaction, substantially proximate to the electronic device. At that moment, the presence confidence score may be a first value, such as 1.0 or 100%. If the predefined presence confidence threshold is 0.5 or 50%, for example, then this may indicate that an individual is likely located nearby the electronic device. In some embodiments, the presence confidence score may decrease in value over time if no additional interactions with the electronic device occur. For example, the presence confidence score may decay to 0.0 (or 0%) over a period of time. In this way, a device may be said to currently be detecting presence so long as the presence confidence score remains greater than the predefined presence confidence threshold. It should be recognized that any suitable technique for measuring activity, and thus presence, for an electronic device may be employed including, but not limited to, detection of a wakeword or trigger expression, detection of an input (e.g., a touch input, a button press, a knob turn, etc.), computer vision recognizing an individual's presence within the device's camera's line of sight, a motion sensor detecting motion, and/or mobile device beaconing (e.g., an RSSI being in excess of an RSSI threshold).

In some embodiments, a shared device, such as the shared devices described above, may correspond to sound controlled electronic device. One type of sound controlled electronic device may be a voice activated electronic device. In particular, a voice activated electronic device may correspond to one type of sound controlled electronic device that is capable of being activated in response to a wakeword being uttered. In response to determining that a wakeword has been uttered, the voice activated electronic device may, in some embodiments, send the audio data representing a spoken utterance to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the sound controlled electronic device may also correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manually activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for selecting a recipient device for a communications session with an initiating device, in accordance with various embodiments. In a non-limiting, exemplary embodiment, individual 2 may send a first message to another individual using initiating electronic device 100*a*. For instance, individual 2 may speak utterance 4, "Alexa—drop in on John," where individual 2 intends to start a communications session with "John," a second individual who may be associated with a particular contact within individual 2's list of contacts. In some embodiments, individual 2 may speak utterance 4 in the vicinity of initiating electronic device 100*a*. Initiating electronic device 100*a*, in one embodiment, may correspond to a voice activated electronic device, capable of causing one or more actions to occur in response to being activated. For example, in response to determining that a wakeword (e.g., "Alexa") was uttered, initiating electronic device 100*a* may begin sending audio data representing utterance 4 to language processing system 200 to be processed, which may cause one or more actions to occur (e.g., generate a response message, receive content, send data to one or more additional devices, etc.).

In some embodiments, in response to initiating device 100*a* detecting a wakeword, language processing system 200 may perform process 150. In some embodiments, process 150 may begin at step 152. At step 152, language processing system 200 receives audio data from initiating device 100*a*. This audio data may represent for example, utterance 4. Upon receiving the audio data, language processing system 200 may apply automatic speech recognition (ASR) processing to the audio data to generate text data. ASR processing can also perform speech identification analysis to the audio data in an attempt to identify the individual speaking (which can provide a wide variety of advantages as is described herein below). The text data can be provided for natural language understanding (NLU) processing that analyzes the text data in order to determine the intent of the spoken utterance, which can be provided as intent data. For example, using text data representing the received audio data, NLU processing may compare the structure of the utterance to various sample utterances in an attempt to match the spoken utterance to one of the sample utterances. For example, utterance 4 may be "Alexa, Drop in on John." NLU processing may determine that utterance 4 has a format of "{Wakeword}, {Start Communications Session} {Contact Name}," and may identify the elements of utterance 4 based on the determined format. For instance, using the previously mentioned format, the NLU processing may determine that the intent of utterance 4 is for a communications session to be started with one of individual 2's contacts having the name "John." NLU processing system may also determine a contact named John is associated with multiple electronic devices. For instance, the audio data, when received by communications system 200, may include a device identifier for device 100*a* (e.g., an MAC address, a serial number, or any other way to identify device 100*a*), which may be used by NLU processing and/or by Accounts module 268 (described in more detail below) to determine the user account of individual 2, and then using that information, the contact list of individual 2 may be obtained.

At step 154, based on the intent data, language processing system 200 determines that a communications session is to be initiated with an entity (i.e., "John") that is associated with multiple electronic devices. For example, once NLU processing determined that individual 2 had an account on communications system 200, that account was accessed in order to review that individual's contact list for entities named "John." In this example, for purposes of illustration and to keep things simpler at this stage, it is assumed there was only one "John" in individual 2's contact list, but that the "John" contact had multiple communications listing, such as phone numbers, and addresses for multiple direct-connect electronic devices (e.g., MAC addresses). As is described in more detail below, NLU processing then was able to determine the direct-connect electronic device that John was most likely location to be near, based on presence information. For example, individual 2's contact for "John" might include a device identifier for three different Echo's, such as an office Echo Show 100*b*, a kitchen Echo Show 100*c*, and a bedroom Echo 100*d*. In this example, John may have been using the Echo Show in the kitchen within the last 3 minutes to obtain a recipe, while John may not have utilized either of the other Echos for a day or two. Under those circumstances, the Echo Show would have a very high presence score that should result in that device being selected as the recipient device.

Thus, even though the user associated with the contact "John" may have first electronic device 100*b*, second electronic device 100*c*, and third electronic device 100*d* identified in contact listing, communications system 200 can determine with a high degree of probability through presence tracking system 242, NLU module 260, and account module 268, which electronic device contact "John" is most likely near, and processing may continue.

Based at least in part on the result of step 154, at step 156, language processing system 200 selects the appropriate device as the recipient device out of multiple electronic devices "John" is associated with. While the present example makes the selection of the "appropriate" device based on the fact that "John" had most recently used his kitchen Echo Show, there are a variety of other factors that can be used to determine presence information, as described in more detail below. In addition, as also described in more detail below, the principles disclosed herein may utilize a number of other factors either instead of, or in addition to, presence information in order to select the most "appropriate" device as the recipient device with which to establish communications. For example, in some embodiments, the systems described herein may select a device as the "appropriate" device for the recipient device based on that device having the highest frequency of wakeword use as compared to other possible devices (i.e., measuring wakeword count), instead of presence information. Once an electronic device is selected as the recipient device, then, in step 158, a communications channel may be established between the initiating device and the recipient device.

In some embodiments, language processing system 200 may receive information from first electronic device 100*b*, second electronic device 100*c*, and third electronic device 100*d*, in order to determine which device to select as the recipient device with which to establish a communications channel. For example, language processing system 200 may receive presence information from first electronic device 100*b*, second electronic device 100*c*, and third electronic device 100*d*. The presence information, however, can be determined a number of different ways, as disclosed herein. Presence information may, for example, indicate that an individual or individuals are located proximate to an electronic device through the use of microphone(s) in each of those devices, which might be activated for a short period of time in order to determine whether an individual or individuals are nearby. For example, if first electronic device 100*b* is detecting elevated or actively changing audio signals, while second electronic device 100*c* and third electronic device 100*d* are detecting relatively stable audio signals, the presence information may be used as an indicator that first electronic device 100*b* should be selected to be the recipient device. In some embodiments, presence information may be determined based on data collected from camera(s) on the devices in question. In that case, the camera(s) could be activated for a short period of time to attempt to detect movement or change in the image area captured by the camera(s), which would indicate the presence of one or more individuals, as compared to an essentially unchanged image over time, which could indicate the absence of anyone being present.

Language processing system 200 may, as described briefly above and in more detail below, receive a wakeword count from each of first electronic device 100*b*, second electronic device 100*c*, and third electronic device 100*d*. A wakeword count may be a number of times an electronic device has detected the wakeword within a given temporal window (such as, for example, the past week, past month, etc.). This information may assist language processing system 200 in determining which electronic device is generally used the most frequently. For example, if second electronic device 100*c* has the highest wakeword count, language processing system may determine that second electronic device 100*c* is the most frequently used device and thus should be selected as the recipient device.

Language processing system 200 may select a device as the recipient device based on user preference information. In the present example, language processing system 200 may be able to access "John's" user account through accounts module 268, and "John" could have one or more preset preferences that define the priority with which an electronic device should be selected to receive communications for "John." That preference information may have a higher or lower priority than, for example, presence information, based on a number of factors, such as whether "John" required such a priority to be taken into account, or based on historical success of achieving success when establishing communications using the techniques described herein. For example, language processing system 200 can, over time, increase or decrease the weight that various factors are given in selecting the recipient device based on how often a given factor was correct in determining an appropriate device to select as the recipient device within a given temporal window. In this manner, the ability of language processing system 200 to achieve success at establishing communications channels upon request should increase over time, and that capability could therefore be adaptable to changing conditions.

In some embodiments, language processing system 200 may filter out devices from the selection process based one or more factors. For example, language processing system 200 may receive enablement information that could indicate whether a user account has enabled/disabled a particular electronic device from being permitted to receive communications. If, for example, second electronic device 100*c* was disabled from receiving communications, language processing system 200 would remove second electronic device 100*c* from the process of selecting a recipient device. This might occur, for example, to a device located in a bedroom when someone is going to sleep in that bedroom. That individual may still be reached for communications, but such communications would have to be established using a different electronic device until the user re-enables the bedroom device. Enablement information may also comprise non-user selectable information, such as whether an electronic device is capable of video communications. For example, first electronic device 100*b* may have display screen 102*b* and second electronic device 100*c* may have display screen 102*c*, and thus both of those devices are capable of engaging in video communications (assuming both devices also have cameras, which would be necessary to have two-way video communications). Third electronic device 100*d*, however, does not have a display screen (or camera), and thus may not be capable of engaging video communications and could therefore may be removed from consideration as the recipient device by language processing system 200 if individual 2 indicated that only the requested communications should be limited to video communications. Another factor that might cause a device from being classified as disabled by language processing system 200, could be any device that is already currently participating in a communications session.

In some embodiments, language processing system 200 may generate an aggregate score based on the particular received information. For example, language processing system 200 may generate an aggregate score based on at least one of the presence information, user preference information, wakeword count, and enablement information. This aggregate score may be used to generate an overall probability of communications success of which electronic device to select from the group of electronic devices being considered for the recipient device. If, for example, first electronic device 100*b* had the highest probability, language processing system 200 may select first electronic device 100*b* as the recipient device.

Figure 2:
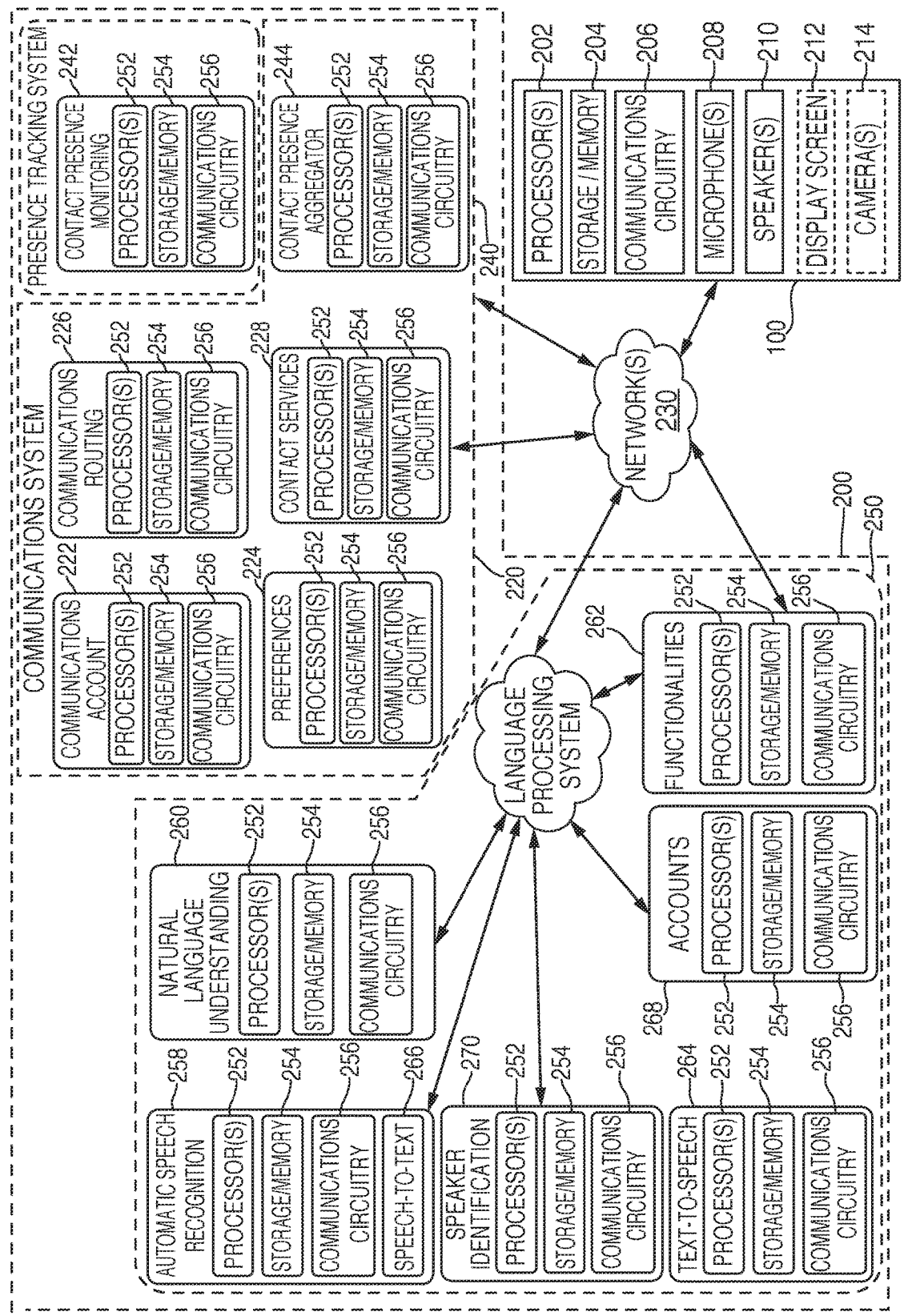
FIG. 2 is an illustrative diagram of the exemplary system architecture of FIG. 1, in accordance with various embodiments.

FIG. 2 is an illustrative diagram of a detailed version of the exemplary system architecture shown in FIG. 1, in accordance with various embodiments. Each of electronic devices 100*a*, 100*b*, 100*c*, and 100*d*, as well as any other similarly capable electronic devices, are collectively generally referred to in FIG. 2 as electronic device 100. Electronic device 100 may, in some embodiments, include sound controlled functionality, such as one or more voice or sound activated components. In some embodiments, electronic device 100 may be configured to communicate with language processing system 200, and in particular a speech-processing system 250, in response to detecting an utterance including a wakeword, which may subsequently be followed by a request/question/statement. Similarly, electronic device 100 may alternatively or additionally include one or more manually activated components for manually activation functionality. In this particular scenario, electronic device 100 may also be configured, in some embodiments, to communicate with language processing system 200, and thus speech-processing system 250, in response to a manual input being detected by one or more input mechanisms, such as a touch screen, a button, and/or a switch, for example.

In non-limiting embodiments, electronic device 100 may be capable of being activated in response to detecting a specific sound, such as a wakeword. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultra-books), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in some embodiments, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with language processing system 200 and/or speech-processing system 250 (such as through network 230), send audio data to language processing system 200 and/or speech-processing system 250, and await/receive a response from language processing system 200 and/or speech-processing system 250. In some embodiments, however, non-voice/sound activated devices may also communicate with language processing system 200 and/or speech-processing system 250 (e.g., push-to-talk devices). For example, in response to a button or touch screen being pressed, or a button or touch screen being pressed and held, a microphone associated with electronic device 100 may begin recording local audio, establish a connection with language processing system 200 and/or speech-processing system 250, send audio data representing the captured audio to language processing system 200 and/or speech-processing system 250, and await/receive a response, and/or action to be occur, from language processing system 200 and/or speech-processing system 250.

It may be recognized that although in the illustrative embodiment shown in FIG. 2, language processing system 200 includes speech-processing system 250, this is merely exemplary, and speech-processing system 250 may be separate from language processing system 200. For example, speech-processing system 250 may be located within a dedicated computing device (such as one or more separate server(s)) or computing system, which may or may not be in communication with language processing system 200 and/or one or more additional devices.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, which in turn may be sent to language processing system 200 and/or speech-processing system 250 in response to a wakeword engine of electronic device 100 determining that a wakeword was uttered.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and language processing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of language processing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component 258 that recognizes human speech in detected audio signals and converts the audio signals to text data. The speech recognition system may also include a natural language understanding ("NLU") component 260 that determines user intent based on the text data it receives from ASR. Also included within the speech recognition system may be a text-to-speech ("TTS") component 264 that is capable of converting text to speech to be outputted by speaker(s) 210 in device 100, and/or a speech-to-text ("STT") component capable of converting received audio signals into text to be sent to language processing system 200 and/or speech-processing system 250 for processing.

The wakeword database may be a database stored locally by storage/memory 204 of electronic device 100, and may include a list of a current wakewords for electronic device 100, as well as one or more previously used, or alternative, wakewords for voice activated electronic device 100. In some embodiments, an individual may set or program a wakeword for their electronic device 100. The wakeword may be programmed directly on electronic device 100, or a wakeword or wakewords may be set by the individual via a local client application that is in communication with language processing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 250 for detecting and responds to subsequent utterances made by an individual.

In some embodiments, storage/memory 204 may store voice biometric data associated with one or more individuals. For example, an individual that operates electronic device 100 may have a registered user account on language processing system 200 (e.g., within accounts system 268). In some embodiments, electronic device 100 may be associated with a group account, and various individuals may have user accounts that are operating under the rules and configurations of the group account. As an illustrative example, initiating electronic device 100a may be associated with a first group account on language processing system 200, the first group account being for a family that lives at a household where first shared electronic device is located. Each family member may also have a user account that is linked to the first group account (e.g., a parent, a child, etc.), and therefore each user account may obtain some or all of the rights of the first group account. For example, electronic device 100 may have a first group account on language processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, such as utterance 4 of FIG. 1, a voice print of that audio data may be generated using speaker identification functionality stored within storage/memory 204. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow electronic device 100 to attempt and identify a speaker of a particular utterance locally. However, persons of ordinary skill in the art will recognize that electronic device 100 may not perform speaker identification processing, and alternatively speaker identification processing may be performed by language processing system 200 (e.g., speaker identification system 228), or no speaker identification processing may be performed all together.

Communications circuitry 206 may include any circuitry allowing or enabling one or more components of electronic device 100 to communicate with one another, or with one or more additional devices, servers, and/or systems. For example, communications circuitry 206 may facilitate communications between electronic device 100 and language processing system 200. As an illustrative example, audio data representing an utterance (e.g., utterance 4 of FIG. 1) may be transmitted over a network 230, such as the Internet, to language processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and language processing system 200. In some embodiments, electronic device 100 and language processing system 200 and/or one or more additional devices or systems (e.g., speech-processing system 250) may communicate with one another via a web browser using HTTP. Various additional communication protocols may be used to facilitate communications between electronic device 100 and language processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include an antenna to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs and outputting audio, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In some exemplary embodiments, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. For example, when an individual is at a distance A from electronic device 100, electronic device 100 may display weather data for a current day. However as the user moves closer to electronic device 100, such as at a distance B from electronic device 100, which may be less than distance A, electronic device 100 may display weather data for a current week. For instance, as the individual gets closer to electronic device 100, the ability of the individual to see denser content increases, and as the individual moves father away from electronic device 100, the individual's ability to see denser content decreases. This, for example, may ensure that the content displayed by electronic device 100 is continually relevant and readable by the individual.

Language processing system 200, in non-limiting, exemplary embodiments, may include speech-processing system 250. However, in other embodiments, speech-processing system 250 may be separate from, or in communication with, language processing system 200. Generally, speech-processing system 250 may, in some embodiments, include one or more remote devices capable of receiving and sending content from/to one or more electronic device, such as electronic device 100. Speech-processing system 250 may include various components and systems including, but not limited to, automatic speech recognition ("ASR") system 258, natural language understanding ("NLU") system 260, functionalities system 262, text-to-speech ("TTS") system 264, and accounts system 268. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, such as a speaker identification ("ID") system, or any other system, or any combination thereof.

ASR system 258 may be configured to recognize human speech in audio signals received from electronic device 100, such as audio captured by microphone(s) 208, which may then be transmitted to speech-processing system 250. ASR system 258 may include, in some embodiments, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU system 260 may be configured such that it determines user intent based on the text data is receives from the ASR system. For example, NLU system 260 may determine that the intent of utterance 4 is for initiating a communications session with a device, associated with a particular name (e.g., initiate a communications session with "John"). In response to determining the intent of the utterance, NLU system 260 may communicate the received command to an appropriate subject matter server or skill on functionalities system 262 to perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 100, and the previous description may apply.

Functionalities system 262 (also referred to as speechlets module 262) may, for example, correspond to various action specific systems or servers, sometimes referred to as "skills," capable of processing various task specific actions. Functionalities system 262 may further correspond to first party applications and/or third party applications capable of performing various tasks or actions. For example, based on the context of the audio data received from electronic device 100, speech-processing system 250 may use a certain functionality to generate a response, or to obtain response information, which in turn may be communicated back to electronic device 100. For instance, an utterance may ask for weather information, and therefore functionalities system 262 may access a weather application to obtain current weather information for a location associated with electronic device 100. Functionalities system 262 may also include processor(s) 252, storage/memory 254, and communications circuitry 256.

TTS system 264 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on language processing system 200. For example, a parent may have a registered account on language processing system 200, and each of the parent's children may have their own user account registered under the parent's registered account. Accounts system 268 may also store one or more group accounts corresponding to one or more shared devices. For example, a shared device, such as shared electronic device 100, may have its own group account stored on accounts system 268. The group account may be associated with the shared device, and may also be linked to one or more individual's user accounts. For example, shared electronic device 100 may be associated with a first group account corresponding to a first grouping of individual (e.g., a family). One or more user accounts may also be associated with the first group account (e.g., individual members of the family), corresponding to individuals that may be capable of interacting with shared electronic device 100. Information, settings, and/or preferences, for example, for each user account may be stored within a user account database. In some embodiments, accounts system 268 may store a voice signal, such as voice biometric information, for a specific user account. This may allow speaker identification techniques to be used to match a voice-to-voice biometric data associated with a specific user account. In some embodiments, accounts system 268 may store a telephone number assigned to a particular user account, a device identifier associated with a particular device, a communications identifier associated with a particular user account and/or group account, or any other suitable information, or any combination thereof.

It should also be recognized that although each of ASR system 258, NLU system 260, subject matter/skills system 262, TTS system 264, and accounts system 268 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, and accounts system 268 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Language processing system 200 may also include, in a non-limiting embodiment, a communications system, which may be configured to facilitate communications between two or more electronic devices. For example, the communications system may be capable of facilitating a communications session between electronic device 100a and at least electronic device 100b. Upon speech-processing system 250 determining that an intent of an utterance is for a communications session to be established with another device, electronic device 100 may access the communications system to facilitate the communications session between the initiating device and the receiving device. For example, the communications system may employ VoIP functionality to facilitate audio, video, and/or text data communications between the initiating device and the recipient device.

As an illustrative example, a communications session between two devices is described below to illustrate how the communications session may be established. In one example embodiment, an individual (e.g., individual 2) may speak an utterance (e.g., "Alexa, send a message to John: 'Want to have dinner at my place?'") to their electronic device (e.g., electronic device 100a). In response to detecting the device's wakeword (e.g., "Alexa"), the electronic device may begin sending audio data representing the utterance to language processing system 200, and in particular speech-processing system 250. Upon receipt, ASR system 258 may perform speech recognition processing, such as speech-to-text processing, to the audio data to generate text data representing the audio data. The text data may then be passed to NLU system 260 to determine the intent of the utterance. For example, NLU system 260 may include a listing of sample utterances to be used to disambiguate the spoken words and determine an action intended to occur for the utterance. In some embodiments, a messaging speechlet system may be included within NLU system 260 that includes one or more sample utterance frameworks. If the format of the spoken utterance substantially matches one of these sample utterances, then that may indicate that the intent of the utterance was for a communications session to be initiated. For instance, one sample utterance may be "{Wakeword}, send a message to {Contact Name}: {Message}." If the framework of the spoken utterance's text data substantially matches this sample utterance framework, then NLU system 260 may determine that the intent of the utterance was to start a communications session with a contact of the user, and NLU may also determine that the intended target of the communications session is "John" (e.g., {Contact Name}: John). After determining that a message is to be sent to a contact named "John," the communications system may access accounts system 268 to determine whether any device identifiers (e.g., a device address) are associated with the contact, "John."

In some embodiments, the communications system may establish a communications session between an initiating device and a recipient device using one or more VoIP protocols including, but not limited to SIP, RTP, RTCP, SRTP, and SDP. In one illustrative embodiment, a SIP signaling command may be provided to the communications system for communicating with the recipient device. In particular, PJSIP functionality adds a new "user-to-user" header that indicates the device pair for the communications session.

In some embodiments, the communications system may include a communication rules engine that may store various rules for how certain communications between group accounts and user accounts are to behave. For example, the communications rules engine may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. In some illustrative embodiments, the communication rules engine may store a communications table indicating various device identifiers, group account identifiers, communication identifiers, and device types for various devices interacting with the communications system.

In some embodiments, the communications system may also include a message data store that may correspond to any suitable type of storage/memory, such as that of storage/memory 204, 254, that is capable of storing one or more messages sent/received. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 268. This way, when an individual requests to receive messages associated with their group account, the message data store may be accessed to obtain any messages currently stored thereby that are associated with that group account's group account identifier.

Language processing system 200 may also include, in some embodiments, a speaker identification system that may correspond to any suitable device/system capable of identifying a particular person's voice from an audio signal. The speaker identification system may determine whether a current voice being used to speak matches known voice biometric data associated with a particular individual's voice. In some embodiments, voice biometric data may be stored within accounts system 268 for various individuals having a user account stored thereby. For example, individual 2 may have a user account on language processing system 200 (e.g., stored within accounts system 268), which may be associated with electronic device 100*a*. Stored within that user account may be voice biometric data associated with a voice profile for individual 2. Therefore, when an utterance, such as utterance 4, is detected by electronic device 100*a*, and subsequently when audio data representing that utterance is received by language processing system 200, the speaker identification system may determine whether the voice that spoke utterance 4 matches, to at least a predefined confidence level, the stored voice biometric information associated with individual 2 stored by their user account. If so, then this may indicate that individual 2 is the likely speaker of utterance 4.

The communications rules engine may employ several communications rules for messages sent/received to/from one or more participants. First, a device type of the sending device may be determined. For example, a determination may be made as to whether or not a device identifier associated with the device that the audio data representing utterance 4, which include a message to be sent to another individual's device, is associated with a shared device. Next, a determination may be made by the speaker identification system as to whether or not a speaker that spoke the utterance was able to be identified. Using these two parameters, for instance, the communications rules engine may be configured to cause the communications system to facilitate communications between two or more devices.

Figure 3:
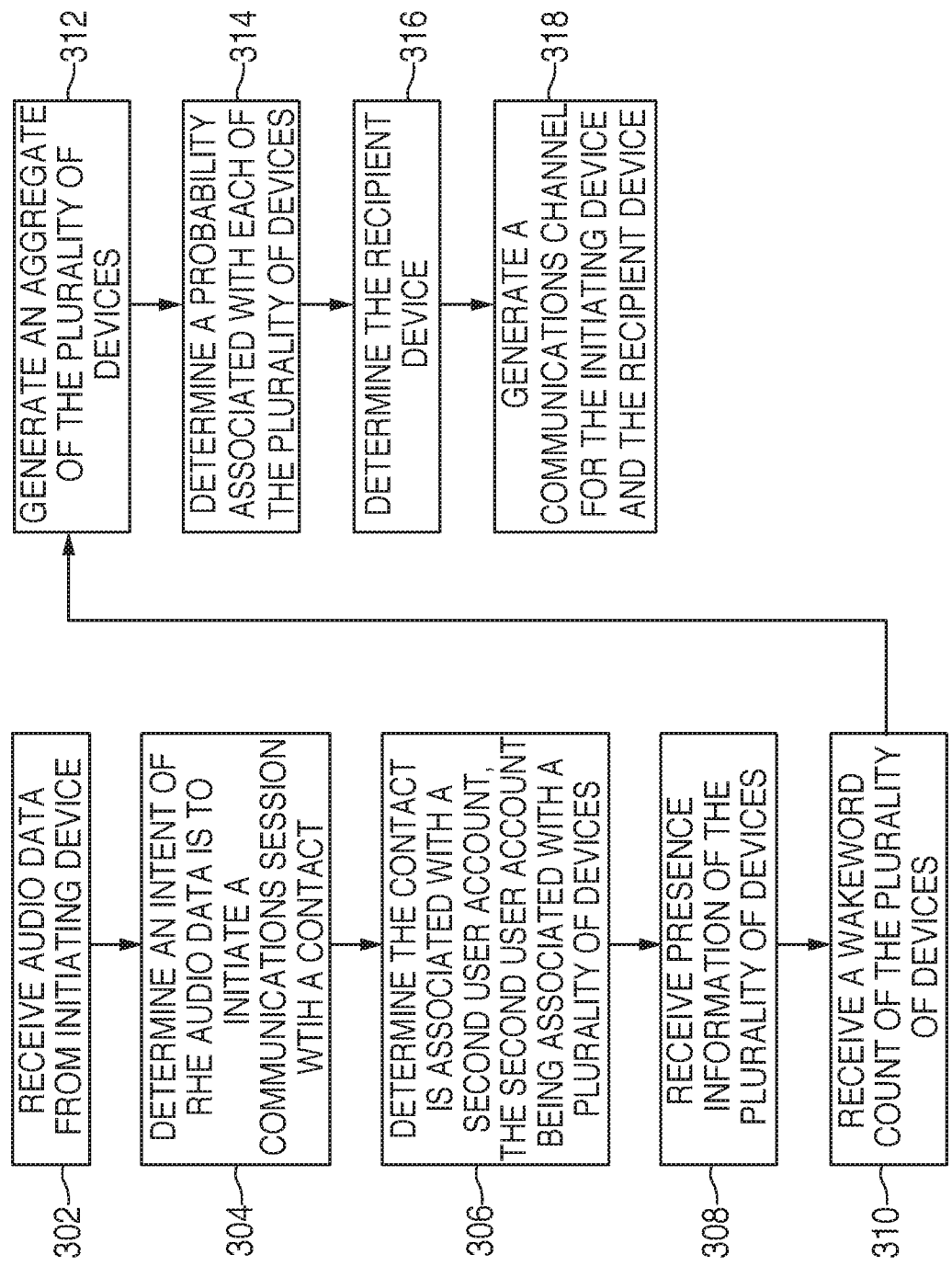
FIG. 3 is an illustrative flowchart of an exemplary process for determining a recipient device in accordance with various embodiments.

FIG. 3 is an illustrative flowchart of an exemplary process 300 for establishing a communication session between an initiating device and a recipient device, in accordance with various embodiments. While the initiating device is known, based on the fact that the utterance requesting the communications was made to an electronic device that is assumed to be the initiating device (and the fact that that device sent the utterance to language processing system 200 for further processing which included a determination that a communications session needs to be established), the recipient device is not known initially, but is selected in accordance with the principles disclosed herein. The process of determining which electronic device should be selected as the recipient device can vary, depending on numerous factors and circumstances which are described in detail throughout this disclosure. For example, various factors that may be considered, either alone or in combination with other non-limiting factors may include: recent use of a device by the intended recipient, whether device is currently in use, a wakeword score that is an indication of how often a given device is being used within a temporal window, whether a device is enabled for the type of communications requested (e.g., video communications versus solely audio communications), whether the intended recipient has set any preferences or preferred order for which device(s) should be selected for communications, etc. In some instances, one or more of these and/or other factors may be combined into an overall aggregate score that may also be used to select the recipient device.

In some embodiments, process 300 may begin at step 302. At step 302, a language processing system receives audio data from an initiating device. The language processing system, as described in process 300, may be substantially similar to language processing system 200 described above in connection with FIGS. 1 and 2, the same descriptions set forth above apply herein. In some embodiments, the language processing system may receive audio data representing an utterance. For example, the audio data may represent an utterance that states "Alexa, drop in on John." Upon receipt of the audio data, the language processing system, which includes a speech-processing system that has an ASR system or module therein, may cause the ASR system to generate text data that represents the audio data by performing speech-to-text processing.

At step 304, the language processing system determines that intent of the audio data is a request to initiate a communications session with an entity that may be identified through a contact in the initiating individual's account. The determination of the intent of the audio data may be made by an NLU system that processes the text data it received from the ASR system. The NLU system may compare the structure of the utterance to various sample utterances in an attempt to match the spoken utterance to one of the sample utterances. For example, the audio data may correspond to an utterance that states "Alexa, Drop in on John." The NLU system may then determine that the utterance has a format that correspond to: "{Wakeword}, {Start Communications Session} {Contact Name}," and may identify the structural elements of the utterance (e.g., wakeword data, intent data, and slots) based on the determined format. For instance, using the previously mentioned format, the NLU system may determine that the intent of the utterance is for a communications session to be initiated with a contact having the name "John." In some embodiments, "John" may be associated with an individual account. In some embodiments, "John" may be associated with a group account. In some embodiments, "John" may be associated with both individual and group accounts. Further processing and analysis is required to attempt to determine which "John" is the best "John" to try to set up a communications session with.

In some embodiments, the language processing system may receive data with the utterance that indicates which user account is associated with the initiating device. For instance, the audio data, when received by the language processing system, may include a device identifier (e.g., an MAC address, a serial number, or any other identification means for an electronic device), which can be used to determine the user account on the language processing system associated with the initiating device. After identifying the user account associated with the initiating device (for example, by accessing accounts module 268), the language processing system may determine whether the individual with that user account has any contacts stored within a contact list associated with that user account that have the name identified (e.g., "John") in the utterance. Assuming there is at least one contact associated with an entity by the name of "John" in the initiating user's contact list, the system could then determine what methods and/or specific devices are identified for communicating with that user. For example, the contact associated with "John" may include three phone numbers, two e-mail addresses, and three device identifiers (as described above, a device identifier refers to information that identifies a specific instance of an electronic device 100, such as a MAC address for an Amazon Echo).

The language processing system may also be able to determine which user account might be associated with that identified contact's name, which could then be used to increase the likelihood that a successful communications channel can be established between the initiating individual and the entity identified by the contact. In particular, if the user account for the entity on the selected contact can be determined, then a more complete list of ways to communicate with that entity maybe identified, such as a more complete list of device identifiers, device addresses (e.g., an IP address, cellular telephone number, GPS locater, etc.), e-mail addresses, phone numbers, etc., may be determined. In addition, any preferences that the intended recipient may have created for communications with that entity can also be taken into account in determining which device should be selected as the recipient device.

At step 306, the language processing system determines that the entity identified by the utterance with whom the communications channel is supposed to be established has a second user account (or it may be referred to as the recipient user account), and that the second user account is associated with multiple electronic devices. Alternatively, the "second user account" may simply refer to the list of devices and/or addresses that are known for the intended recipient from the contact stored on the initiating individual's contact list. In either instance, the language processing system can use the acquired information to identify a list of devices associated with the intended recipient. The information may be obtain from accounts module 268, as described above in connection with FIG. 2, either through the initiating individual's contact or through direct access to the intended recipient's user account, if there is such an account, and if it is accessible.

At step 308, the language processing system can receive presence information related to each of the devices being considered for the recipient device. The presence information may include, for example, use data that indicates whether a device is being used, or has recently been used (which implies that someone is at the device currently using it, or was at that location using it recently). Other examples of presence information may be used in accordance with the principles disclosed herein include, for example, whether microphones associated with the device have detected any sound, and if so, whether human speech can be detected within that sound; or whether an analysis of images taken by a camera located within that device indicate that movement has recently occurred in that room (in this regard, the camera could record a static image and compare that image to a series of images taken over time—any changes that appear in a comparison of two images would strongly suggest that something is moving about in the room), or any other information that may be used to indicate that an electronic device is active or was recently active, at one level, and at another level, if possible, the identity of entities using that device (which, of course, may be more difficult to obtain).

Whatever presence information is available may be periodically sent to the language processing system, or it may be sent on request, to allow the language processing system to determine what level of recent activity has occurred In some embodiments, the presence information may, as described above, indicate that an individual or individuals are or were located proximate to a specific electronic device. In some embodiments, the electronic devices may include one or more microphone(s), which may be able to determine whether an individual or individuals are located near an electronic device by listening for sound. For example, if one of the electronic devices is detecting audio, while the other electronic devices are not, the presence information could be heavily weighted in the decision to select that device as the recipient device. In some embodiments, presence information may include whether data collected from camera(s) within an electronic device can be used to determine the presence of an individual using motion detection (by comparing images for change) or facial recognition, if such detailed images are available.

At step 310, the language processing system can receive a wakeword count for each of the devices under consideration to be selected as the recipient device. The wakeword count may be, for example, the number of times specific electronic device has detected the wakeword (and responded appropriately) in a given time period or temporal window, such as the number of times a device has acted on detecting a wakeword in the past week. This information may be utilized by the language processing system as an indication of which electronic device of the electronic devices under consideration is used the most frequently, or as an indication of comparative use between the devices being considered. For example, if one electronic device has a significantly higher wakeword count than any of the other devices, then that device might be selected to be the recipient device based on that factor alone. In other instances, the wakeword count information may be used in combination with other factors and information in deciding which device to select as the recipient device.

In some embodiments, the language processing system may receive sessions initiation protocol status data, user preference data, and status data, any and/or all of which may be used to determining which device to select as the recipient device. Sessions initiation protocol status data may be similar to the SIP data described above in connection with FIG. 2. User preference data, in some embodiments, may be used to limit or direct the selection of a device as the recipient device based on the preferences that have been set by the intended recipient (this assumes that a user account and or user profile for that individual are identifiable and accessible by the language processing system). In some embodiments, the preferences may include general preferences, such as a "do not disturb" preference or an "available" preference. The do not disturb preference, for example, may indicate that the intended recipient is completely unavailable, in which case the attempt to establish a communications session should be terminated. Device status data may be utilized as an indication of whether a specific device in on-line and available for communications; on-line, but already engaged in communications; or off-line and unavailable for communications (similar to a cell phone being set to airplane mode while also disabling Wi-Fi).

At step 312, the language processing system can generate an aggregate score for each of the devices being considered as the recipient device. The aggregate score may be based on a combination of weighted values for any number of different factors, including the factors discussed herein. For example, instead of selecting a recipient device based solely on presence information or on wakeword count, each of those factors could be given a weighted score that could be processed or combined to form an aggregate score that could then be used to determine which device to select as the recipient device. Similarly, SIP status information, user preferences, device status, etc., are all additional factors that could be utilized in compiling an aggregate score for each device. The language processing system could utilize aggregate scores as a second level of decision making, particularly in situations where the current factors being considered do not result in one device standing out from other devices for selection as the recipient device. For example, wakeword count was initially being considered as the primary factor in deciding on the recipient device and two electronic devices have very similar wakeword counts, the language processing system could simply go to another factor, such as presence information, or the system could take the wakeword count and combine it with the presence information into an aggregate score that may be more indicative of all of the factors being considered.

At step 314, the language processing system can determine a probability of success for each device being considered as the recipient device. The probability of success, which is somewhat similar to the aggregate score in that it is based on multiple weighted factors, indicates as a percentage the likelihood that the entity the initiating individual is trying to communicate with, will be successfully reached using the electronic device being considered. Probability of success, however, may be most useful in situations where the status of one or more factors should be overwhelming in the selection process, versus the aggregate score that simply combines weighted inputs for each factor being considered. For example, is the intended recipient just completed a communications session with device 100d, there is an extremely high probability of success that the intended recipient could still be reached at device 100d, and that, accordingly, device 100d should be selected as the recipient device.

Probability of success can also be used advantageously to eliminate devices from consideration, such as when a device is off-line or hasn't had a wakework detection in more than one month. In both instances, it seems much more likely than not that the device in question has an extremely low probability of being a part of a successful communication between the initiating individual and the intended recipient—so the device should be removed from consideration, which could speed up the process.

At step 316, the language processing system selects a device as the recipient device based on whichever factor or factors were selected for consideration. In general, the more information that can be obtained, the higher likelihood of success that the selection will result in communications between the initiating individual and the intended recipient. Moreover, different factors may carry more or less weight for different individuals and/or devices. In practice, the language processing system can adjust which factors to consider more prevalently in the selection process, and which to give less weight to, and those decisions can change over time, such that the system can be inherently adaptable and should, therefore, be able to improve its performance in establishing successful communications over time. Once the selection of the recipient device is made, then, in step 318, a communications channel is established between the initiating device and the selected recipient device. It should be noted that not all of the steps shown with regard to process 300 need not be carried out in selecting an electronic device as the recipient device, particularly if one factor weighs heavily toward a specific device and a successful communication (or other factors could added in to the selection process without departing from the principles disclosed herein.

Figure 4:
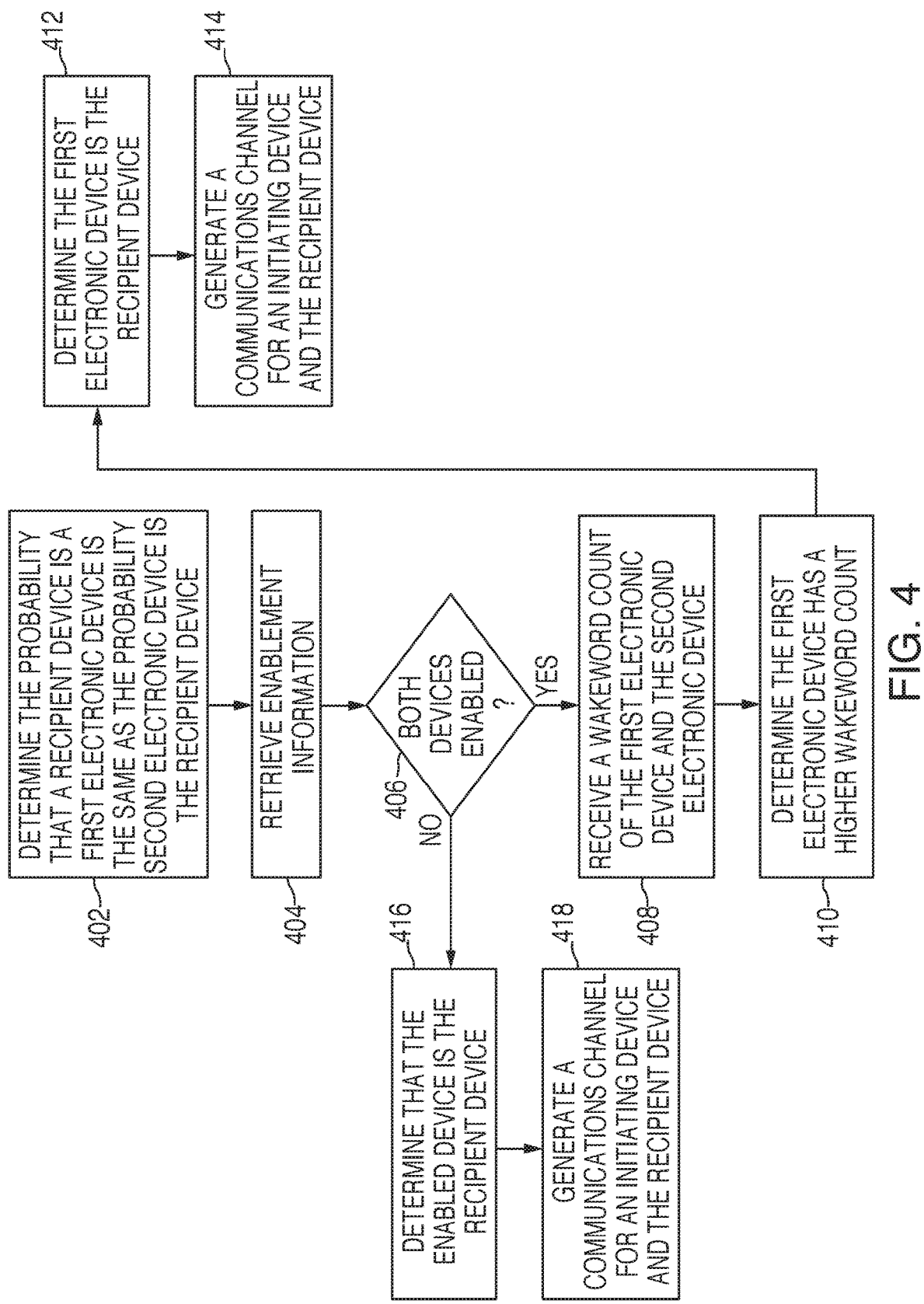
FIG. 4 is another illustrative flowchart of an exemplary process for determining a recipient device in accordance with various embodiments.

FIG. 4 is another illustrative flowchart of an exemplary process 400 for selecting an electronic device as the recipient device in a communications channel, in accordance with various embodiments. In some embodiments, process 400 may begin at step 402, which assumes that some analysis has already occurred in the selection process, and that the probability of success that either the first electronic device or the second electronic device should be selected as the recipient device is roughly the same. The language processing system, as described in process 400, may be similar to language processing system 200 described above in connection with FIGS. 1 and 2, the same descriptions may be applied to process 400 as well. For example, an initial review of presence information and wakeword count may have resulted in opposite and offsetting results as related to which of a first and second electronic device should be selected as the recipient device. The wakeword count may have been very high for the first device and very low for the second, while the presence information may have factored very highly in favor of selecting the second device over the first. When viewed together, neither device stands out as a "better" selection for the recipient device, so further analysis is required.

At step 404, the language processing system can retrieve enablement information that may remove one or more devices from consideration. For example, the intended recipient may have either enabled one device as that user's primary device for communications, or the intended recipient may have disable a particular device from communications, such as an Echo Show located in a bedroom. In any case, at step 404, the enablement status of each device being considered as the recipient device is obtained.

At step 406, the language processing system can determine whether both the first and second devices are currently enabled for communications. If both devices are currently enabled, the language processing system may continue at step 408 attempting to select a device to be the recipient device. If only one of the first and second electronic devices is enabled, the decision is simple and the enabled device is selected as the recipient device in step 416. Obviously, if neither device is enabled, the language processing system may not generate a communications channel using those devices, so the process is terminated and an appropriate message is produced by the NLU system, which is handed off to the TTS system to be converted to audio signals that are eventually transmitted to the initiating device for playback to the individual who made the requesting utterance in the first place.

When both the first and second devices are enabled, process 400 continues by receiving the wakeword count for both the first electronic device and the second electronic device, as that is highly indicative of relative activity of the device itself. As described above, the wakeword count may refer to the number of times a particular electronic device has detected the wakeword in a given time period (or temporal window).

At step 410, the language processing system can compare the different wakeword counts for each device under consideration as the recipient device. In this instance, where only first and second devices are being considered, it can be determined that the first electronic device has a higher wakeword count than the second electronic device.

Accordingly, at step 412, the language processing system selects the first electronic device as the recipient device based on the significantly higher wakeword count. Once the recipient device is selected, at step 414, the language processing system establishes a communications channel between the initiating device and the recipient device. It should be noted that process 400 can be modified by adding or omitting various steps without departing from the principles disclosed herein, and that some steps could be replaced with other steps that consider different factors as described herein. For example, instead of the wakeword count being ultimately determinative, in steps 408, 410, and 412, presence information might be used as the final primary factor in selecting which device should be the recipient device.

Figure 5:
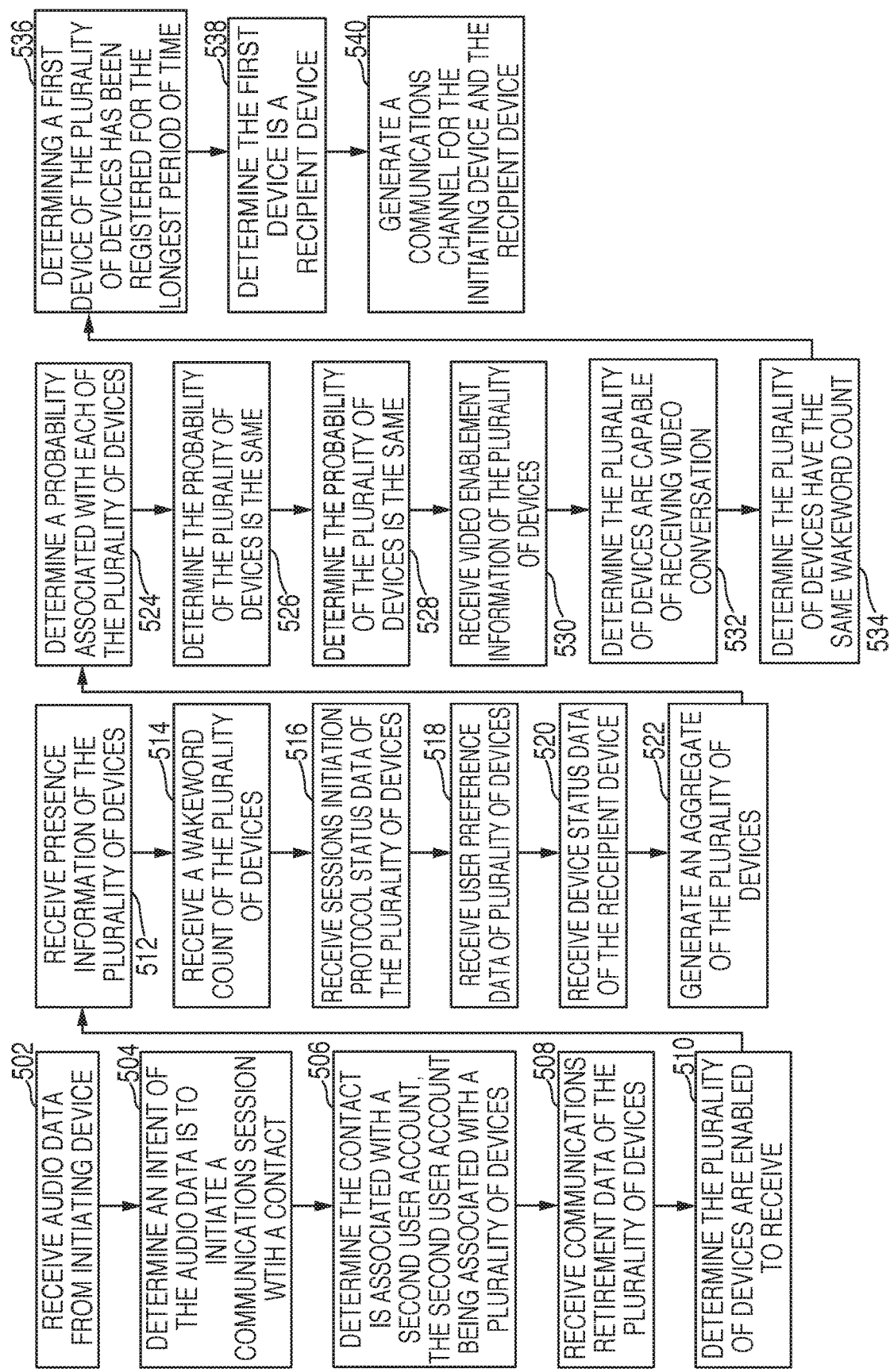
FIG. 5 is another illustrative flowchart of an exemplary process for determining a recipient device in accordance with various embodiments.

FIG. 5 is another illustrative flowchart of an exemplary process 500 for determining which electronic device should be selected as the recipient device, in accordance with various embodiments. It should be noted that process 500 attempts to address in some way, each of the factors that have been previously described that could be considered in selecting a particular electronic device as the recipient device over one or more other devices. Accordingly, process 500 includes considering whether the electronics devices being considered are enable/disabled, presence information for each device, wakeword count for each device, SIP status for each device, user preference settings for each device, the operational status of each device, the use of aggregate scores based on other factors for each device, the calculated probability of a successful communication between the initiating device and the device that could be selected as the recipient device, etc. Each of the factors and considerations may be combined with each other, taken alone, or combined with other factors, as previously described. The ultimate goal of each of process 300, 400, and 500, and of other similar processes, is to understand and then execute the request made by the individual on the initiating device to be able to communicate with the entity identified by the individual in the initial utterance, and for the communication channel to be established as quickly and as seamlessly as possible, even if the individual provided only a minimal amount of information about the intended recipient and/or recipient device.

In some embodiments, process 500 may begin at step 502. At step 502, a language processing system receives audio data from an initiating device. The language processing system, which is described in process 500, may be similar to language processing system 200 described above in connection with FIGS. 1 and 2, and the same descriptions can be applied in the same manner herein. For example, the received audio data may represent an utterance: "Alexa, drop in on John." In a step that is not shown in FIG. 5, but is understood from the discussion above and from the illustrations in FIGS. 1-4, ASR processing can be applied to the received audio data to generate representative text data.

At step 504, NLU processing is applied to the text data to determine the meaning of the text data and to determine the intent of the utterance, which in this case is a request to initiate a communications session with a person named "John.". For example, the NLU system may determine that the utterance has a format of "{Wakeword}, {Start Communications Session} {Contact Name}," and may identify the elements of the utterance based on the determined format. For instance, using the previously mentioned format, the NLU system may determine that the intent of the utterance is to start a communications session with a contact having the name "John." In some embodiments, "John" may be associated with an individual account. In some embodiments, "John" may be associated with a group account. In some embodiments, "John" may be associated with both individual and group accounts.

In some embodiments, the language processing system may receive data indicating which user account is associated with the initiating device. For instance, the audio data, when received by the language processing system, may include a device identifier (e.g., an MAC address, a serial number, or any other identification means for an electronic device), which may be used to determine the user account of the individual who spoke the utterance from the language processing system (such as through accounts module 268). After identifying the user account associated with the initiating device, the language processing system may determine if that account contains a contact list, and if so, whether there are any contacts stored within that contact list for that user account having the identified name (e.g., "John"). Once a specific name is identified, the language processing system may be able to determine whether the identified name on the contact has its own user account on the language processing system. If the contact's user account can be determined, device identifiers and device addresses (e.g., an IP address, cellular telephone number, GPS locater, etc.) that the named entity uses may be determined for any devices associated with that user's account.

At step 506, assuming that the intended recipient has an individual user on the language processing system, the system can determine which devices are associated with that user. Once the language processing system determines which devices are associated with the intended recipient, i.e., the contact named "John," The language processing system should be able to retrieve the recipient's account profile, which may include a preference file as well as a more complete list of devices that are associated with that user.

At step 508, the language processing system can receive communications enablement data for each of the devices that are being considered for the recipient device. The communications enablement data, as described above, may indicate the enablement status for each of the devices under consideration.

At step 510, the language processing system may determine that all of the devices under consideration to be the recipient device are enabled to receive communications (e.g., to show that enablement was considered, but not determinative in this representative example). At step 512, the language processing system can receive presence information for each of the devices under consideration, but it again assumed that the presence information is not determinative of which device should be selected as the recipient device. At step 514, the language processing system can receive a wakeword count for each of the devices being considered, but again, this factor is not determinative either. At step 516, the language processing system can receive SIP status data for each of the devices being considered, but that is also not determinative. At step 518, the language processing system can receive user preference data related to each of the devices being considered to be the recipient device, but that also is not determinative.

At step 520, the language processing system can receive device status data for each of the devices being consider, but that is also not determinative. At step 522, the language processing system can generate an aggregate score based on other factors mentioned above for each of the devices being considered, but in this example, that also is not determinative. At step 524, the language processing system can determine a probability of success related to whether the desired communications channel will be established, that is associated with each of the devices being considered for the recipient device, but that too is not determinative because, at step 526, the language processing system then can determine that the probability for each of the devices is "the same," (probabilities will be considered to be "the same" if the percentage of one probability varies from the percentage of another by less than a predetermined amount, such as, for example, 5%).

At step 528, the language processing system can receive video enablement information for each of the devices being considered, and at step 530, the language processing system can determine that all of the devices being considered are capable of receiving video communications (accordingly, no devices are eliminated or selected at this step either). At step 532, the language processing system can determine that all of the devices have the same wakeword count (after first receiving the wakeword count for each device), so again, no determination has been made of which device should be the recipient device.

Finally, at step 534, the language processing system determines that a first device of the devices has been registered with the system for the longest period of time (and that there is a measurable gap in time between the registration of the first device and the next oldest device, thereby being determinative). Accordingly, at step 536, the language processing system selects the first device as the recipient device, and at step 538, the language processing system establishes a communication channel between the initiating device and the recipient device, and process 500 ends.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method comprising:
   receiving input data corresponding to a request to establish communication between a requestor and an intended recipient;
   determining, from contact data associated with the intended recipient, a plurality of devices associated with the intended recipient, the plurality of devices comprising:
   a first device, and
   a second device;
   determining first device data indicating a hardware capability corresponding to the first device;
   determining second device data indicating a hardware capability corresponding to the second device;
   receiving first wakeword count data corresponding to the first device;
   receiving second wakeword count data corresponding to the second device;
   selecting the first device based at least in part on the first device data, the second device data, the first wakeword count data and the second wakeword count data; and
   sending, to the first device, communication data originating from a third device associated with the requestor.

2. The computer-implemented method of claim 1, further comprising:
   determining that the request corresponds to establishing a video communication;
   determining that the first device data indicates that the first device is capable of engaging in video communication; and
   establishing a video communication session between the first device and the third device.

3. The computer-implemented method of claim 1, further comprising:
receiving first presence data corresponding to the first device; and
receiving second presence data corresponding to the second device,
wherein the selecting is further based at least in part on the first presence data and second presence data.

4. The computer-implemented method of claim 1, further comprising:
receiving first status data corresponding to the first device; and
receiving second status data corresponding to the second device,
wherein the selecting is further based at least in part on the first status data and second status data.

5. The computer-implemented method of claim 1, further comprising:
receiving first user preference data corresponding to at least one of the first device and the second device,
wherein the selecting is further based at least in part on the first user preference data.

6. The computer-implemented method of claim 1, further comprising:
receiving first data indicating that the first device was registered on a first date; and
receiving second data indicating that the second device was registered on a second date,
wherein the selecting is further based at least in part on the first date and the second date.

7. The computer-implemented method of claim 1, wherein the input data comprises input audio data and the method further comprises:
performing speech processing on the input audio data to determine a name corresponding to the intended recipient;
determining the input audio data corresponds to the requestor; and
using the name to identify the contact data from a plurality of contacts associated with the requestor.

8. The computer-implemented method of claim 1, further comprising:
receiving, from the third device, video data corresponding to a message to the intended recipient;
storing the video data;
receiving, from the second device, a second request to play the message; and
determining the message corresponds to video data,
wherein the sending is further based at least in part on the message corresponding to video data.

9. The computer-implemented method of claim 1, wherein:
the first device corresponds to a personal account associated with the intended recipient;
the second device corresponds to a group account associated with the intended recipient; and
the method further comprises:
receiving, from the third device, video data corresponding to a message to the intended recipient;
storing the video data;
receiving, from the second device, a second request to play messages; and
determining the message corresponds to the personal account,
wherein the sending is further based at least in part on the message corresponding to the personal account.

10. A system comprising:
at least one processor; and
memory including instructions operable to be executed by the at least one processor to cause the system to:
receive input data corresponding to a request to establish a video communication between a requestor and an intended recipient;
determine, from contact data associated with the intended recipient, a plurality of devices associated with the intended recipient, the plurality of devices comprising:
a first device, wherein the first device corresponds to a personal account associated with the intended recipient, and
a second device, wherein the second device corresponds to a group account associated with the intended recipient;
determine first device data indicating the first device is capable of video communication;
determine second device data indicating a hardware capability corresponding to the second device;
determine the request corresponds to the personal account;
select, based at least in part on the first device data, the second device data and the request, the first device; and
establish a video communication session between the first device and a third device associated with the requestor.

11. The system of claim 10, wherein the memory further comprises instructions that, when executed by the at least one processor, further cause the system to:
process the second device data to determine the second device is not capable of video communication.

12. The system of claim 10, wherein the memory further comprises instructions that, when executed by the at least one processor, further cause the system to:
receive first presence data corresponding to the first device; and
receive second presence data corresponding to the second device,
wherein the instructions that cause the system to select the first device are further based at least in part on the first presence data and second presence data.

13. The system of claim 10, wherein the memory further comprises instructions that, when executed by the at least one processor, further cause the system to:
receive first status data corresponding to the first device; and
receive second status data corresponding to the second device,
wherein the instructions that cause the system to select the first device are further based at least in part on the first status data and second status data.

14. The system of claim 10, wherein the memory further comprises instructions that, when executed by the at least one processor, further cause the system to:
receive first user preference data corresponding to at least one of the first device and the second device,
wherein the instructions that cause the system to select the first device are further based at least in part on the first user preference data.

15. The system of claim 10, wherein the memory further comprises instructions that, when executed by the at least one processor, further cause the system to:
receive first data corresponding to a first wakeword count corresponding to the first device; and receive second data corresponding to a second wakeword count corresponding to the second device,
wherein the instructions that cause the system to select the first device are further based at least in part on the first data and second data.

16. The system of claim 10, wherein the memory further comprises instructions that, when executed by the at least one processor, further cause the system to:
receive first data indicating that the first device was registered on a first date; and
receive second data indicating that the second device was registered on a second date,
wherein the instructions that cause the system to select the first device are further based at least in part on the first date and the second date.

17. The system of claim 10, wherein the input data comprises input audio data and the memory further comprises instructions that, when executed by the at least one processor, further cause the system to:
perform speech processing on the input audio data to determine a name corresponding to the intended recipient;
determine the input audio data corresponds to the requestor; and
use the name to identify the contact data from a plurality of contacts associated with the requestor.

18. The system of claim 10, wherein the memory further comprises instructions that, when executed by the at least one processor, further cause the system to:
receive, from the third device, video data corresponding to a message to the intended recipient;
store the video data;
receive, from the second device, a second request to play the message; and
determine the message corresponds to video data,
wherein the instructions that cause the system to select the first device are further based at least in part on the message corresponding to video data.

19. The system of claim 10, wherein:
the memory further comprises instructions that, when executed by the at least one processor, further cause the system to:
receive, from the third device, video data corresponding to a message to the intended recipient;
store the video data; and
receive, from the second device, a second request to play messages.

* * * * *